(12) United States Patent
Park et al.

(10) Patent No.: US 8,815,967 B2
(45) Date of Patent: Aug. 26, 2014

(54) POROUS POLYUREA MATERIAL AND METHODS FOR PREPARING THE SAME

(75) Inventors: Ji-Woong Park, Gwangju (KR);
Su-Young Moon, Gwangju (KR);
Jae-Sung Bae, Gwangju (KR)

(73) Assignee: Gwangju Institute of Science an Technology, Buk-Gu, Gwangju (KR)

( * ) Notice: Subject to any disclaimer, the term of this patent is extended or adjusted under 35 U.S.C. 154(b) by 0 days.

(21) Appl. No.: 13/378,199

(22) PCT Filed: Jul. 26, 2010

(86) PCT No.: PCT/KR2010/004893
§ 371 (c)(1),
(2), (4) Date: Dec. 14, 2011

(87) PCT Pub. No.: WO2011/013970
PCT Pub. Date: Feb. 3, 2011

(65) Prior Publication Data
US 2012/0095123 A1    Apr. 19, 2012

(30) Foreign Application Priority Data
Jul. 27, 2009    (KR) .................. 10-2009-0068295

(51) Int. Cl.
*C08J 9/00*    (2006.01)
*C08G 18/32*    (2006.01)
*C08G 18/76*    (2006.01)
*C08G 18/77*    (2006.01)

(52) U.S. Cl.
USPC ............. 521/63; 521/64; 521/162; 521/163

(58) Field of Classification Search
USPC ...................... 521/63, 64, 163, 162
See application file for complete search history.

(56) References Cited

U.S. PATENT DOCUMENTS

RE27,917 E * 2/1974 Jefferson et al. ............... 521/63

OTHER PUBLICATIONS

Laliberte et al.; Molecular tectonics—Use of urethanes and ureas derived from tetraphenylmethane and tetraphenylsilane to build porous chiral hydrogen-bonded metworks; Can. J. Chem. 82: 386-398 (2004).*

* cited by examiner

*Primary Examiner* — Rabon Sergent
(74) *Attorney, Agent, or Firm* — Nath, Goldberg & Meyer; Jerald L. Meyer; Stanley N. Protigal

(57) ABSTRACT

A porous polyurea material may be prepared by polymerization and crosslinking of tetra(4-aminophenyl)methane or tetra(4-aminophenyl)silane with a monomer having two to four isocyanate (—NCO) groups, or by polymerization and crosslinking of tetra(4-isocyanatophenyl)methane or tetra(4-isocyanatophenyl)silane with a monomer having two to four amino groups. The method includes: mixing an organic solution of tetra(4-aminophenyl)methane with an organic solution of a monomer having two to four isocyanate groups; reacting the mixed solution under a nitrogen atmosphere; and drying a semi-solid or solid material formed by gelation of the reaction solution, or adding the reaction solution to a non-solvent before gelation of the reaction solution to form a precipitate, followed by drying, or applying the reaction solution to a substrate before gelation of the reaction solution, followed by drying. The introduction of the monomer having a tetrahedral structure can impart good chemical resistance, heat resistance and durability to the porous polyurea material.

17 Claims, 14 Drawing Sheets

POROUS POLYUREA MATERIAL AND METHODS FOR PREPARING THE SAME

This is a National Phase Application filed under 35 U.S.C. 371 as a national stage of PCT/KR2010/004893, filed Jul. 26, 2010, and claiming the benefit from Korean Application No. 10-2009-0068295, filed Jul. 27, 2009, the content of each of which is hereby incorporated by reference in its entirety.

TECHNICAL FIELD

The present invention relates to a porous polymeric material and methods for preparing the same. More specifically, the present invention relates to a porous polyurea material and methods for preparing the same.

BACKGROUND ART

Nanoporous materials are known to exhibit physical, chemical and biological properties and material characteristics inherent to nanomaterials. Nanoporous materials have a vast surface area. Based on these characteristics, reviews are conducted on the application of nanoporous materials to new fields, such as energy, environmental, advanced catalyst and tissue engineering fields. Nanoporous polymers are generally low in density and thermal capacity. Nanoporous polymers are very poor conductors of heat. Due to these advantages, nanoporous polymers are particularly recognized as promising advanced materials that can find application in various fields, including filters, catalyst supports, sensors, electrochemical materials, biomedical materials, and electronic materials for semiconductors. Under such circumstances, numerous studies have been conducted on methods for the preparation of porous polymer structures. Most organic materials synthesized hitherto have non-uniform pores or exhibit low mechanical strength and are not readily processable into various forms, impeding substantial application thereof. Thus, there is a need for materials that possess a uniform pore size and a large specific surface area and have mechanical strength, thermal stability, chemical resistance and processability appropriate for use in various application fields. There is also a need for methods for preparing the materials.

DISCLOSURE

Technical Problem

The present invention provides a porous polyurea material that is highly resistant to chemicals and heat and is highly durable.

Further, the present invention provides methods for preparing the porous polyurea material in various forms based on high processability of the porous polyurea material.

Technical Solution

In accordance with an aspect of the present invention, a porous polyurea material may be obtained by polymerization and crosslinking of a monomer represented by Formula 1:

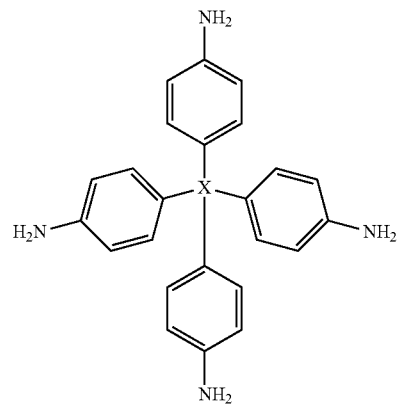

<Formula 1>

(wherein X is a carbon atom or a silicon atom) with a monomer having two to four isocyanate groups, or by polymerization and crosslinking of a monomer represented by Formula 2:

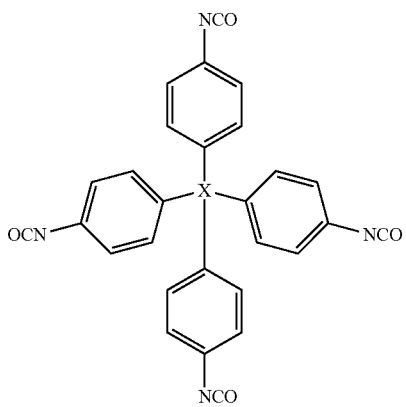

<Formula 2>

(wherein X is a carbon atom or a silicon atom) with a monomer having two to four amino groups.

The monomer having two to four isocyanate groups may be a $C_1$-$C_{20}$ aliphatic compound substituted with two to four isocyanate groups or a $C_6$-$C_{30}$ aromatic compound substituted with two to four isocyanate groups. The monomer having two to four amino groups may be a $C_1$-$C_{20}$ aliphatic compound substituted with two to four amino groups or a $C_6$-$C_{30}$ aromatic compound substituted with two to four amino groups. An example of the $C_1$-$C_{20}$ aliphatic compound substituted with two isocyanate groups or the $C_1$-$C_{20}$ aliphatic compound substituted with two amino groups may be a compound represented by Formula 3:

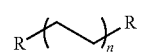

<Formula 3> wherein each R is an isocyanate group or an amino group, and n is an integer from 2 to 6.

The $C_6$-$C_{30}$ aromatic compound substituted with two to four isocyanate groups and/or the $C_6$-$C_{30}$ aromatic compound substituted with two to four amino groups may be selected from the group consisting of compounds represented by Formulae 4 to 10:

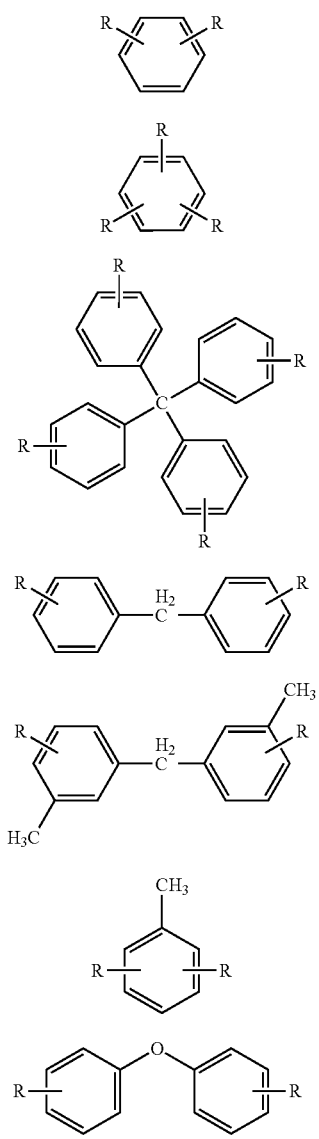

<Formula 4>
<Formula 5>
<Formula 6>
<Formula 7>
<Formula 8>
<Formula 9>
<Formula 10>

(wherein each R is an isocyanate group or an amino group).

The porous material may have a pore diameter of 0.5 mm to 3.0 mm and a specific surface area of 50 m²/g to 1,000 m²/g.

In accordance with another aspect of the present invention, there are provided methods for preparing various porous polyurea materials. In an embodiment, a method for preparing a bulky porous polyurea material may include (a) mixing an organic solution of the monomer represented by Formula 1 with an organic solution of a monomer having two to four isocyanate groups, or mixing an organic solution of the monomer represented by Formula 2 with an organic solution of a monomer having two to four amino groups, (b) reacting the mixed solution under a nitrogen atmosphere, and (c) drying a semi-solid or solid material formed by gelation of the reaction solution.

In another embodiment, a method for preparing a particulate porous polyurea material may include (a) mixing an organic solution of the monomer represented by Formula 1 with an organic solution of a monomer having two to four isocyanate groups, or mixing an organic solution of the monomer represented by Formula 2 with an organic solution of a monomer having two to four amino groups, (b) reacting the mixed solution under a nitrogen atmosphere, and (c) adding the reaction solution to a non-solvent before gelation of the reaction solution to form a precipitate, followed by drying. The porous material prepared by the method may have a particle diameter of 20 nm to 1,000 nm.

In another embodiment, a method for preparing a film-like porous polyurea material may include (a) mixing an organic solution of the monomer represented by Formula 1 with an organic solution of a monomer having two to four isocyanate groups, or mixing an organic solution of the monomer represented by Formula 2 with an organic solution of a monomer having two to four amino groups, (b) reacting the mixed solution under a nitrogen atmosphere, and (c) applying the reaction solution to a substrate before gelation of the reaction solution, followed by drying.

The monomer having two to four isocyanate groups used to prepare the corresponding porous polyurea material may be a $C_1$-$C_{20}$ aliphatic compound substituted with two to four isocyanate groups or a $C_6$-$C_{30}$ aromatic compound substituted with two to four isocyanate groups. The monomer having two to four amino groups used to prepare the corresponding porous polyurea material may be a $C_1$-$C_{20}$ aliphatic compound substituted with two to four amino groups or a $C_6$-$C_{30}$ aromatic compound substituted with two to four amino groups. An example of the $C_1$-$C_{20}$ aliphatic compound substituted with two isocyanate groups or the $C_1$-$C_{20}$ aliphatic compound substituted with two amino groups may be the compound represented by Formula 3. An example of the $C_6$-$C_{30}$ aromatic compound substituted with two to four isocyanate groups and/or the $C_6$-$C_{30}$ aromatic compound substituted with two to four amino groups may be selected from the group consisting of the compounds represented by Formulae 4 to 10.

Each of the organic solutions used in steps (a) of the polyurea preparation methods may have a concentration of 1 to 5% (wt/vol).

Advantageous Effects

According to exemplary embodiments of the invention, the introduction of the monomer having a tetrahedral structure can impart good chemical resistance, heat resistance and durability to the porous polyurea material. In addition, the porous polyurea material may be prepared in various forms by varying the preparation method thereof.

MODE FOR INVENTION

Exemplary embodiments of the present invention will now be described in detail with reference to the accompanying drawings. The invention may, however, be embodied in various different forms and should not be construed as being limited to the embodiments set forth herein. Rather, these embodiments are provided so that this disclosure will be thorough and complete, and will fully convey the scope of the invention to those skilled in the art. Like numbers refer to like elements throughout the specification.

Figure 1:
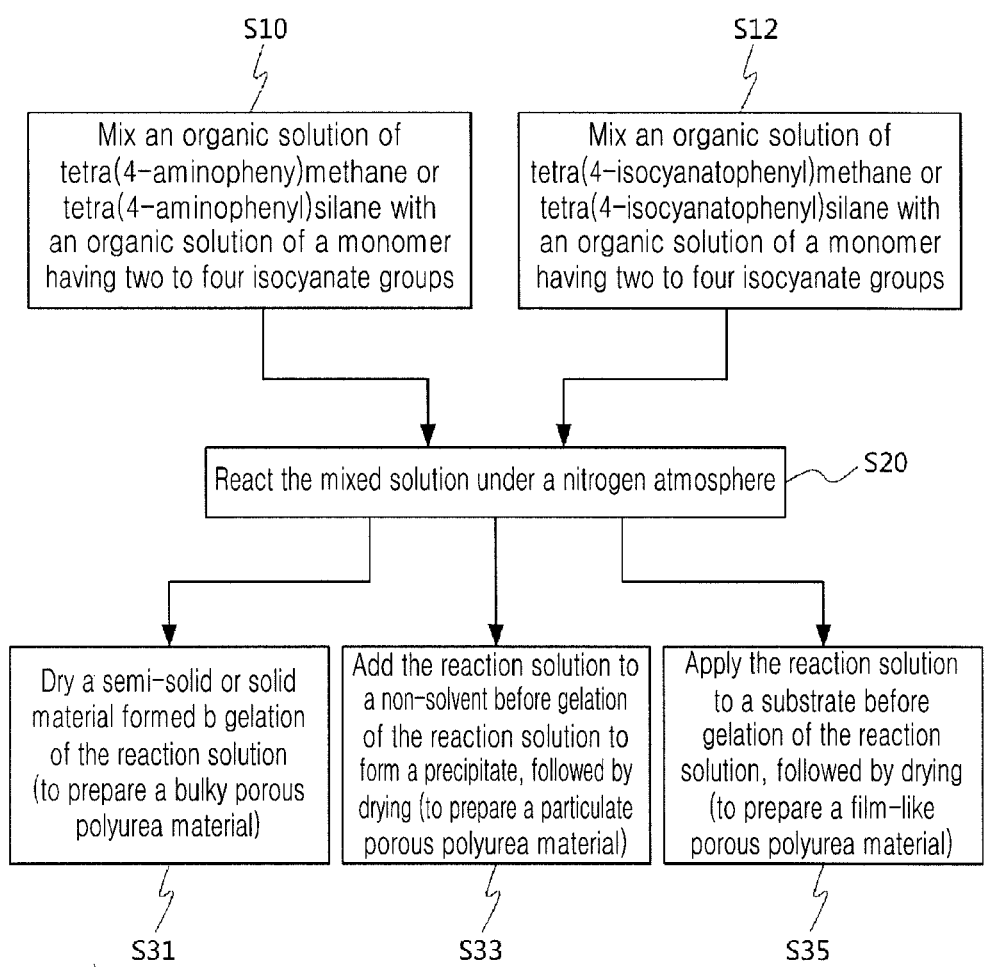
FIG. 1 is a flowchart illustrating a method for preparing a porous polyurea material according to an embodiment of the present invention.

FIG. 1 is a flowchart illustrating a method for preparing a porous polyurea material according to an embodiment of the present invention.

Referring to FIG. 1, first, an organic solution of tetra(4-aminophenyl)methane or tetra(4-aminophenyl)silane as a monomer represented by Formula 1 is mixed with an organic solution of a monomer having two to four isocyanate (—NCO) groups (S10), or an organic solution of tetra(4-isocyanatophenyl)methane or tetra(4-isocyanatophenyl)silane as a monomer represented by Formula 2 is mixed with an organic solution of a monomer having two to four amino (—NH$_2$) groups (S12).

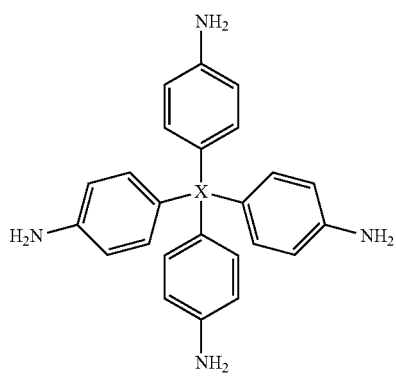

<Formula 1> wherein X is a carbon atom or a silicon atom.

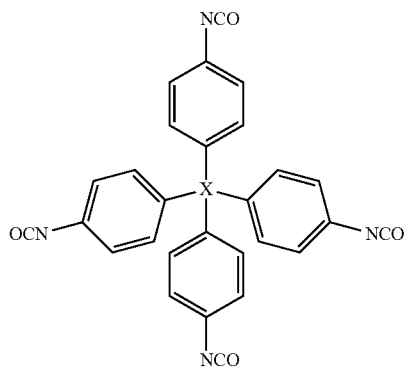

<Formula 2> wherein X is a carbon atom or a silicon atom.

An example of the monomer having two to four isocyanate groups may be a $C_1$-$C_{20}$ aliphatic compound substituted with two to four isocyanate groups or a $C_6$-$C_{30}$ aromatic compound substituted with two to four isocyanate groups. An example of the monomer having two to four amino groups may be a $C_1$-$C_{20}$ aliphatic compound substituted with two to four amino groups or a $C_6$-$C_{30}$ aromatic compound substituted with two to four amino groups. More specifically, the $C_1$-$C_{20}$ aliphatic compound substituted with two isocyanate groups or the $C_1$-$C_{20}$ aliphatic compound substituted with two amino groups may be a compound represented by Formula 3:

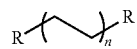

<Formula 3> wherein each R is an isocyanate group or an amino group, and n is an integer from 2 to 6.

The $C_6$-$C_{30}$ aromatic compound substituted with two to four isocyanate groups and/or the $C_6$-$C_{30}$ aromatic compound substituted with two to four amino groups may be selected from the group consisting of compounds represented by Formulae 4 to 10:

<Formula 4>

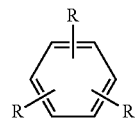

<Formula 5>

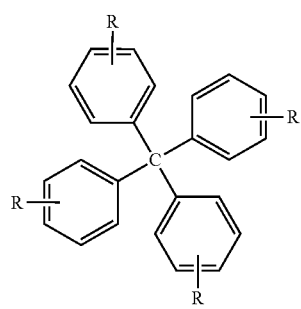

<Formula 6>

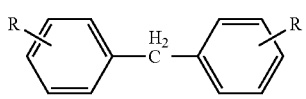

<Formula 7>

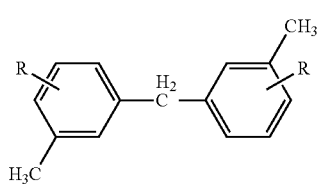

<Formula 8>

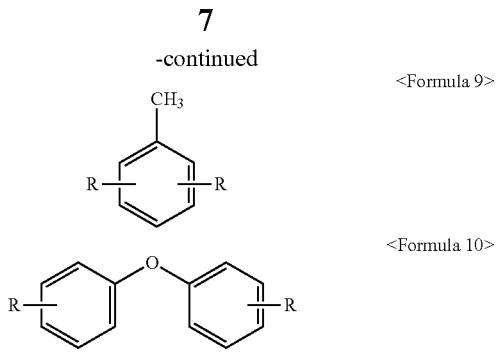

<Formula 9>

<Formula 10>

(wherein each R is an isocyanate group or an amino group).

That is, the amino groups and isocyanate groups of the two monomers included in the mixed solution are reactive groups capable of forming urea bonds by polymerization. At least one of the monomer having amino groups and the monomer having isocyanate groups has a tetrahedral structure having reactive groups at ends thereof. The monomers are preferably mixed in a suitable stoichiometric molar ratio such that all amino groups and isocyanate groups present in the monomers can react with each other. For example, tetra(4-aminophenyl)methane and 1,4-diisocyanatobenzene may be mixed in a molar ratio of 1:2, and tetra(4-aminophenyl)methane and tetra(4-isocyanatophenyl)methane may be mixed in a molar ratio of 1:1.

Then, the mixed solution is allowed to react under a nitrogen atmosphere (S20). This reaction condition suppresses side reactions caused by moisture in air and allows for polymerization and crosslinking between the monomers only to prepare a porous polyurea material in a desired form. The reaction may be understood by the mechanism that the polymerization occurs by nucleophilic addition between the amino groups and the isocyanate groups of the two monomers and the crosslinking occurs by nucleophilic addition between polymers to be prepared after polymerization. Since the polymerization and crosslinking reactions are based on the same mechanism, their reaction steps are not clearly distinguished. The polymerization and the crosslinking may occur simultaneously and all at once in the course of preparing a porous polyurea material. In this case, the gelation of the reaction solution proceeds to increase the degree of polymerization and the degree of crosslinking of a final polyurea. The polyurea in the form of fine particles having very small pores before gelation of the reaction solution may become a bulky semi-solid or solid state after gelation of the reaction solution. The gelation rate of the reaction solution is dependent upon the concentration of the monomers mixed. Accordingly, the porous material may be prepared in various forms by suitably varying the concentration of the mixed solution and the preparation method thereof. Specifically, (1) a bulky porous polyurea material may be prepared by allowing the reaction to proceed such that the reaction solution is gelled, and drying a semi-solid or solid material formed by gelation of the reaction solution (S31). It is preferred that each of the monomer solutions has a concentration of 1% (wt/vol) or higher. If the concentration is lower than 1% (wt/vol), too long a time is taken for the gelation of the reaction solution or substantial gelation may not occur, making it impossible to prepare a bulky porous polyurea material. Alternatively, (2) a particulate porous polyurea material may be prepared by adding the reaction solution to a non-solvent before gelation of the reaction solution to form a precipitate, followed by drying (S33). The particle diameter of the particulate porous polyurea material may be adjusted to 20 nm to 1,000 nm by appropriately varying the reaction time of the mixed solution (i.e. the time taken until the reaction solution is added to the non-solvent). The non-solvent is a material capable of precipitating the porous polyurea material present in the form of fine particles in the reaction solution. A polar aprotic solvent, such as acetone, may be used as the non-solvent. Alternatively, (3) a film-like porous polyurea material may be prepared by applying the reaction solution to a substrate before gelation of the reaction solution, followed by drying (S35). The reaction solution may be applied by a suitable process selected from spin coating, dip coating, ink jet printing, spray coating, screen printing, drop casting and doctor blade. In the methods (2) and (3), the concentration of each of the monomer solutions is preferably 5% (wt/vol) or lower. If each of the monomer solutions has a concentration higher than 5% (wt/vol), the reaction solution is gelled at a very high rate. As a result, the polyurea exists in the form of fine particles for too short a time, which makes it substantially difficult to obtain a precipitate in the form of particles, and the polyurea loses its solution processability after gelation, which makes it difficult to prepare a film-like porous polyurea material. Therefore, when it is intended to prepare a bulky porous polyurea material, a particulate porous polyurea material and a film-like porous polyurea material by the methods (1) to (3), respectively, it is preferred to prepare the mixed solution from the organic solutions having concentrations of 1 to 5% (wt/vol). Each of the porous materials prepared by the methods may have a pore size of 0.5 nm to 3.0 nm and a specific surface area of 50 $m^2/g$ to 1,000 $m^2/g$.

As described above, according to the methods of the present invention, porous polyurea materials may be prepared in various forms, unlike other porous polymeric materials. In addition, there is no difficulty in purifying the porous polyurea materials because no by-products are produced during polymerization and crosslinking reactions. Another advantage of the methods according to the present invention is that problems, such as deformation of the polymers and pore collapse and clogging, are not caused during purification. The monomer having a tetrahedral structure present in the mixed solution acts as a kind of crosslinking point during the reaction. A three-dimensional polymer network may be formed in which strong covalent bonds are connected to the crosslinking point. Therefore, the porous polyurea material three-dimensionally polymerized and crosslinked from a tetraphenylmethane derivative, such as tetra(4-aminophenyl)methane or tetra(4-isocyanatophenyl)methane, or a tetraphenylsilane derivative, such as tetra(4-aminophenyl)silane or tetra(4-isocyanatophenyl)silane, as a center may have a very large specific surface area due to the presence of many fine pores therein. The high crosslinking rate and strong covalent bonding can impart good chemical resistance, heat resistance and durability to the porous material. Therefore, the porous polyurea material of the present invention may be easily prepared in various forms appropriate for excellent physical properties and purposes of utilization thereof (for example, the porous polyurea material may be prepared in the form of a films when it is applied to separators or in the form of particles when it is applied to fillers and storages). The present invention has significance in that the porous polyurea material may be applied to various industrial fields due to its ease of processing.

The following preferred examples serve to assist in the understanding of the invention. These examples are set forth for illustrative purposes only and are not intended to limit the invention.

Preparation Example 1

Preparation of Bulky Porous Polyurea Material 1.314 mmol of tetra(4-aminophenyl)methane was dissolved in N,N-dimethylformamide (DMF) to prepare a 5% (wt/vol) organic solution, and 2.628 mmol of 1,4-diisocyanatobenzene was dissolved in DMF to prepare a 5% (wt/vol) organic solution. Next, the tetra(4-aminophenyl)methane solution was slowly added to and mixed with the 1,4-diisocyanatobenzene solution. The mixed solution was allowed to react under a nitrogen atmosphere at room temperature for 50 h to form a solid material. The solid material was washed with a mixed solution of DMF and THF, isolated, washed three times with acetone, and dried under vacuum at 300° C. for 3 d, yielding a bulky porous polyurea material.

Preparation Example 2

Preparation of Bulky Porous Polyurea Material

A porous polyurea material was obtained in the same manner as in Preparation Example 1, except that 1,6-diisocyanatohexane (2.628 mmol) was used instead of 1,4-diisocyanatobenzene to prepare a 5% (wt/vol) organic solution.

Preparation Example 3

Preparation of Bulky Porous Polyurea Material

A porous polyurea material was obtained in the same manner as in Preparation Example 1, except that tetra(4-isocyanatophenyl)methane (1.314 mmol) was used instead of 1,4-diisocyanatobenzene to prepare a 5% (wt/vol) organic solution.

Preparation Example 4

Preparation of Particulate Porous Polyurea Material 1.314 mmol of tetra(4-aminophenyl)methane was dissolved in N,N-dimethylformamide (DMF) to prepare a 1% (wt/vol) organic solution, and 2.628 mmol of 1,4-diisocyanatobenzene was dissolved in DMF to prepare a 1% (wt/vol) organic solution. Next, the tetra(4-aminophenyl)methane solution was slowly added to and mixed with the 1,4-diisocyanatobenzene solution. The mixed solution was allowed to react under a nitrogen atmosphere at room temperature for 24 h. The reaction solution was slowly precipitated in acetone. The precipitate was washed three or more times with a large amount of acetone and dried under vacuum at 150° C. for 3 d, yielding a particulate porous polyurea material.

Preparation Example 5

Preparation of Particulate Porous Polyurea Material

A particulate porous polyurea material was obtained in the same manner as in Preparation Example 4, except that 1,6-diisocyanatohexane (2.628 mmol) was used instead of 1,4-diisocyanatobenzene to prepare a 1% (wt/vol) organic solution.

Preparation Example 6

Preparation of Particulate Porous Polyurea Material

A particulate porous polyurea material was obtained in the same manner as in Preparation Example 4, except that tetra(4-isocyanatophenyl)methane (1.314 mmol) was used instead of 1,4-diisocyanatobenzene to prepare a 1% (wt/vol) organic solution.

Preparation Example 7

Preparation of Particulate Porous Polyurea Material 1.314 mmol of tetra(4-aminophenyl)methane was dissolved in N,N-dimethylformamide (DMF) to prepare a 1% (wt/vol) organic solution, and 2.628 mmol of 1,4-diaminobenzene was dissolved in DMF to prepare a 1% (wt/vol) organic solution. Next, the tetra(4-aminophenyl)methane solution was slowly added to and mixed with the 1,4-diaminobenzene solution. The mixed solution was allowed to react under a nitrogen atmosphere at room temperature for 24 h. The reaction solution was slowly precipitated in acetone. The precipitate was washed three or more times with a large amount of acetone and dried under vacuum at 150° C. for 3 d, yielding a particulate porous polyurea material.

Preparation Example 8

Preparation of Particulate Porous Polyurea Material

A particulate porous polyurea material was obtained in the same manner as in Preparation Example 7, except that 4,4'-oxydianiline (2.628 mmol) was used instead of 1,4-diaminobenzene to prepare a 1% (wt/vol) organic solution.

Preparation Example 9

Preparation of Film-Like Porous Polyurea Material 1.314 mmol of tetra(4-aminophenyl)methane was dissolved in N,N-dimethylformamide (DMF) to prepare a 1% (wt/vol) organic solution, and 2.628 mmol of 1,4-diisocyanatobenzene was dissolved in DMF to prepare a 1% (wt/vol) organic solution. Next, the tetra(4-aminophenyl)methane solution was slowly added to and mixed with the 1,4-diisocyanatobenzene solution. The mixed solution was allowed to react under a nitrogen atmosphere at room temperature for 24 h. The reaction solution was applied to a substrate and dried at 80° C., yielding a film-like porous polyurea material.

Preparation Example 10

Preparation of Film-Like Porous Polyurea Material

A film-like porous polyurea material was obtained in the same manner as in Preparation Example 9, except that 1,6-diisocyanatohexane (2.628 mmol) was used instead of 1,4-diisocyanatobenzene to prepare a 1% (wt/vol) organic solution.

Preparation Example 11

Preparation of Film-Like Porous Polyurea Material

A film-like porous polyurea material was obtained in the same manner as in Preparation Example 9, except that tetra(4-isocyanatophenyl)methane (1.314 mmol) was used instead of 1,4-diisocyanatobenzene to prepare a 1% (wt/vol) organic solution.

Figure 2:
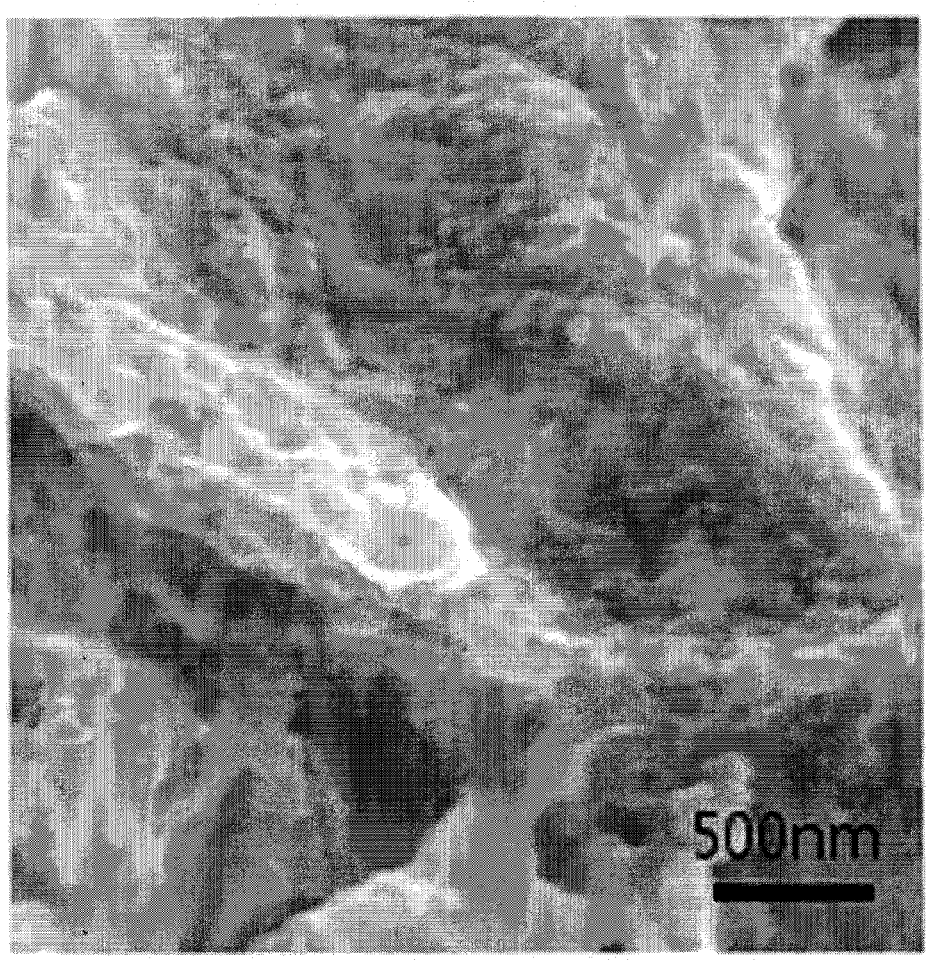
FIGS. 2 to 4 are SEM images of a bulky porous polyurea material, a particulate porous polyurea material and a film-like porous polyurea material prepared in Preparation Examples 1, 4 and 9, respectively.
Figure 3:
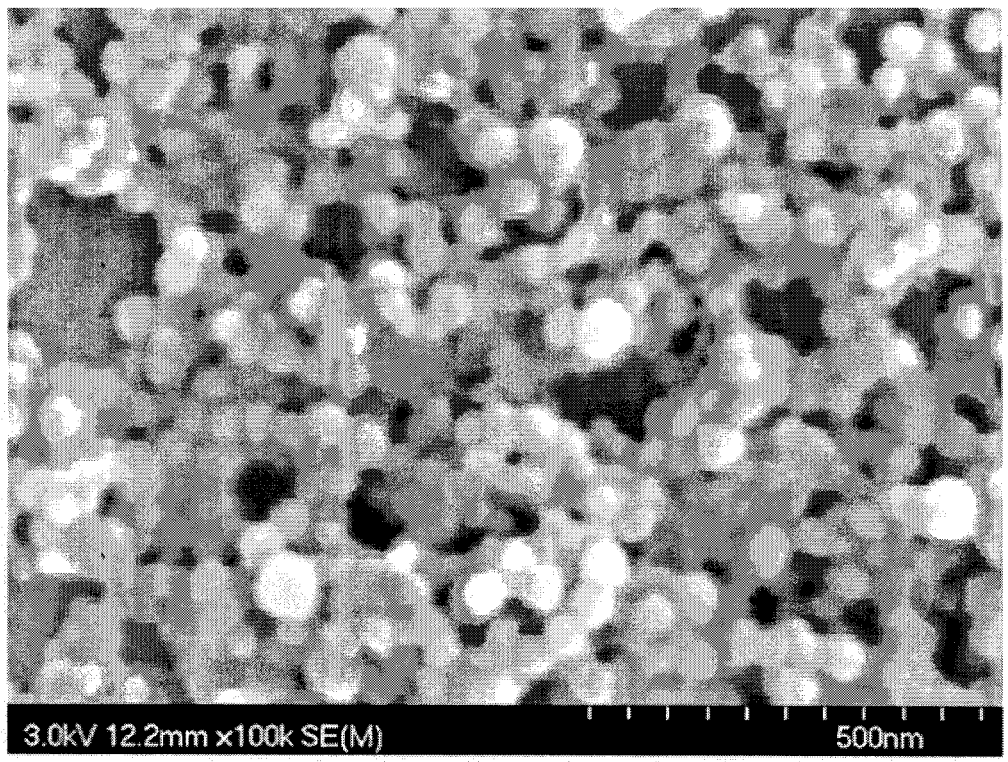
Figure 4:
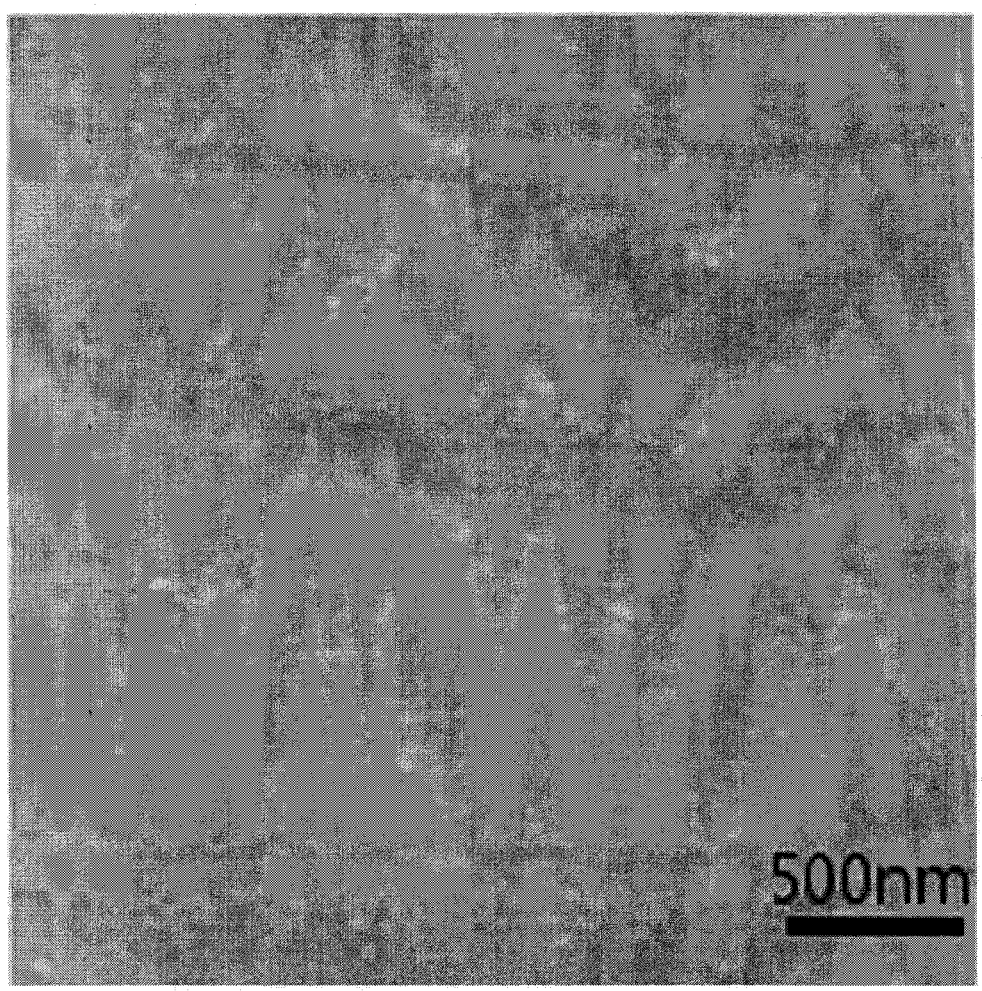
Figure 5:
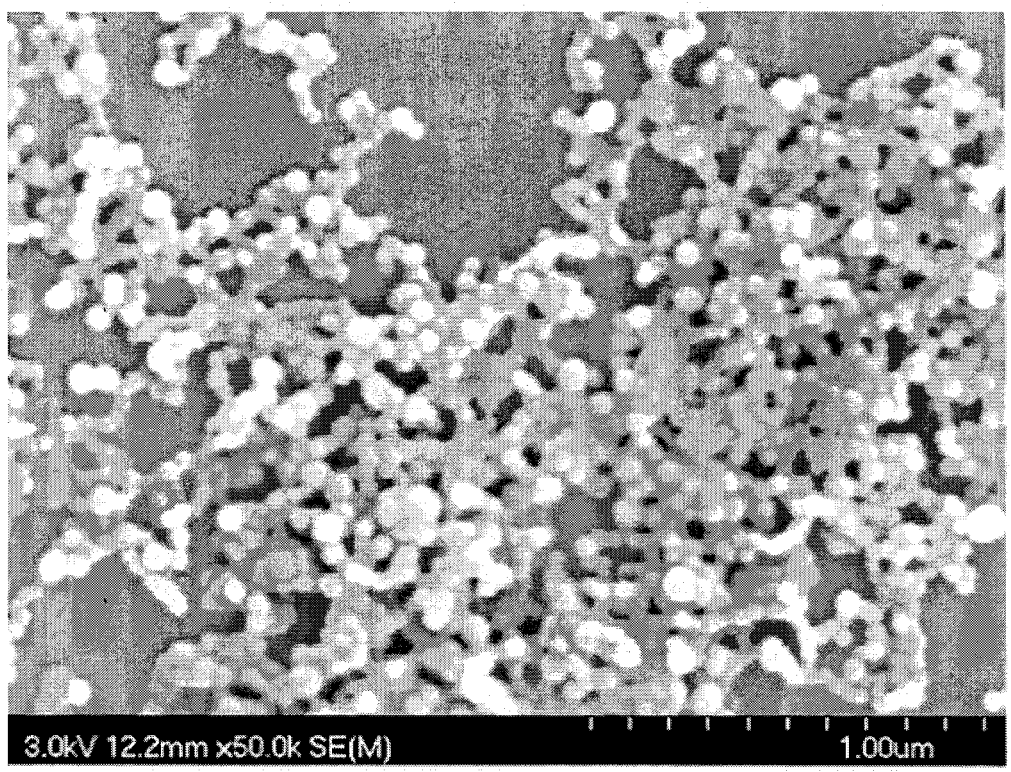
FIGS. 5 to 11 are SEM images of various kinds of porous particles prepared using different monomers for different reaction times in accordance with a method for preparing a particulate porous polyurea material.
Figure 6:
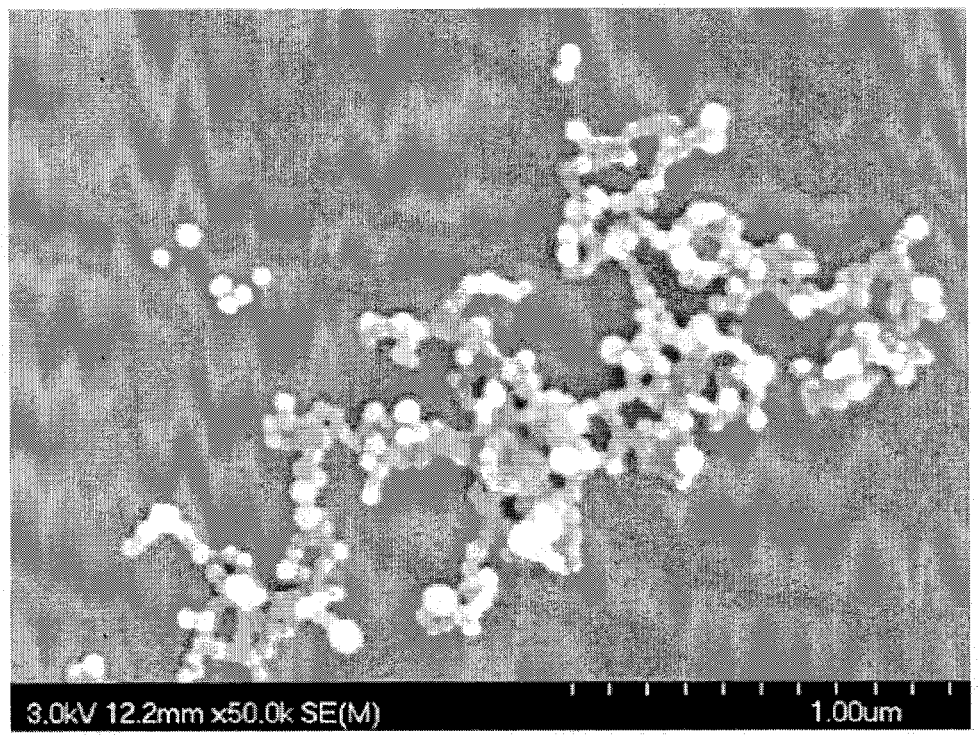
Figure 7:
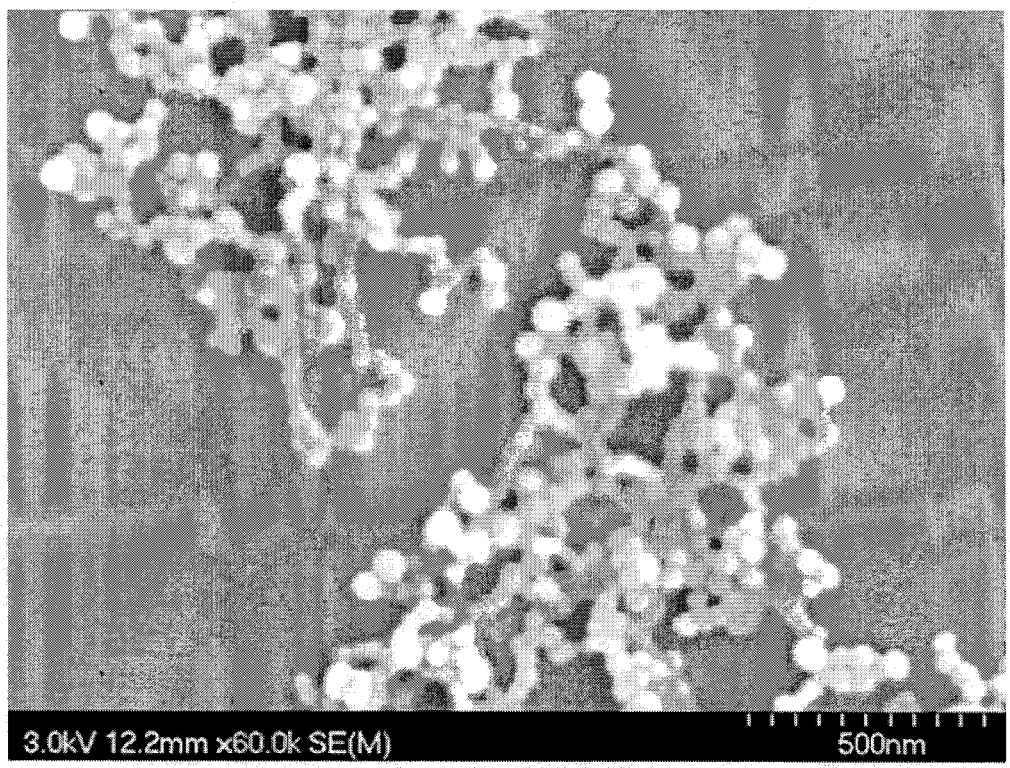
Figure 8:
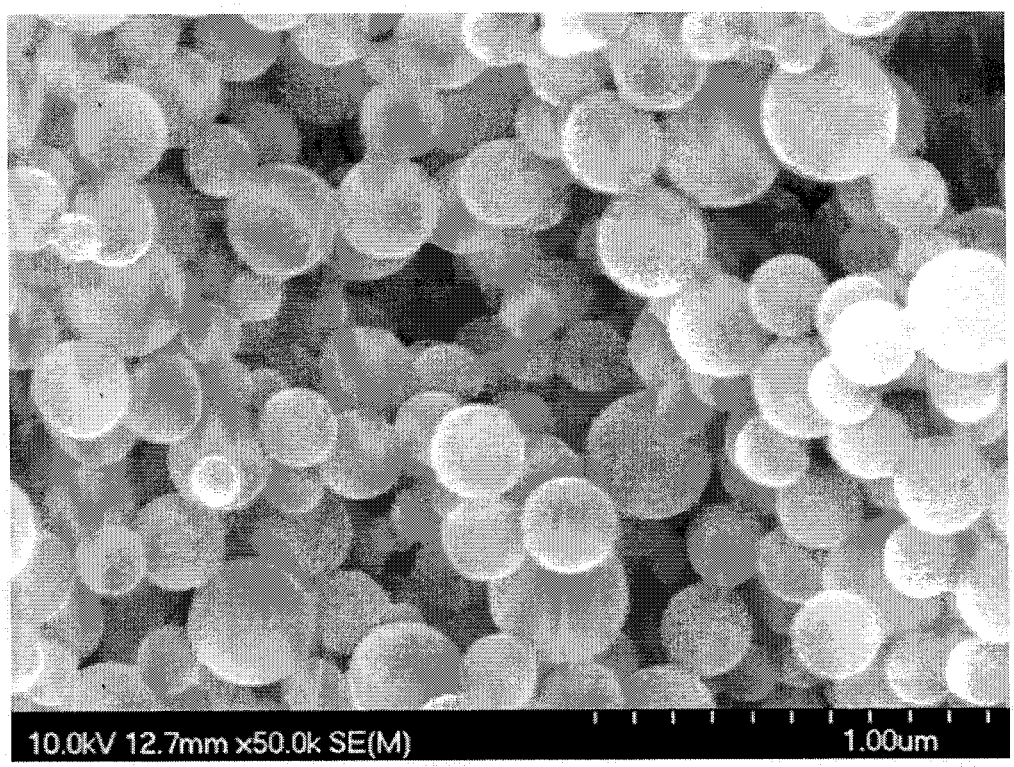
Figure 9:
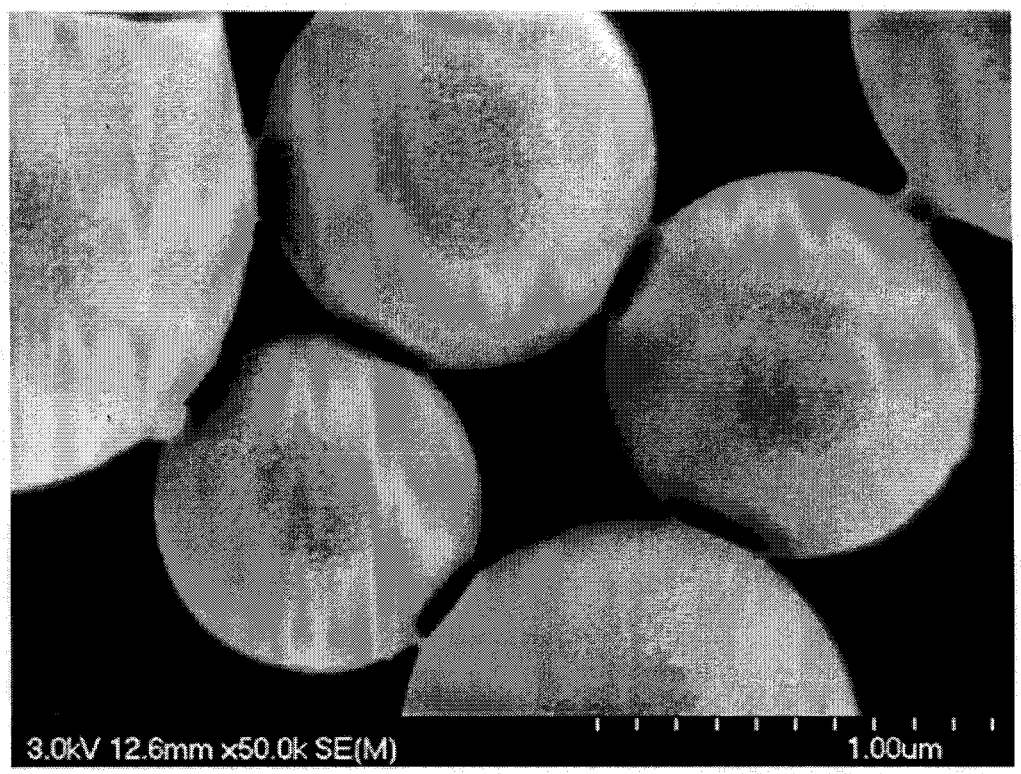
Figure 10:
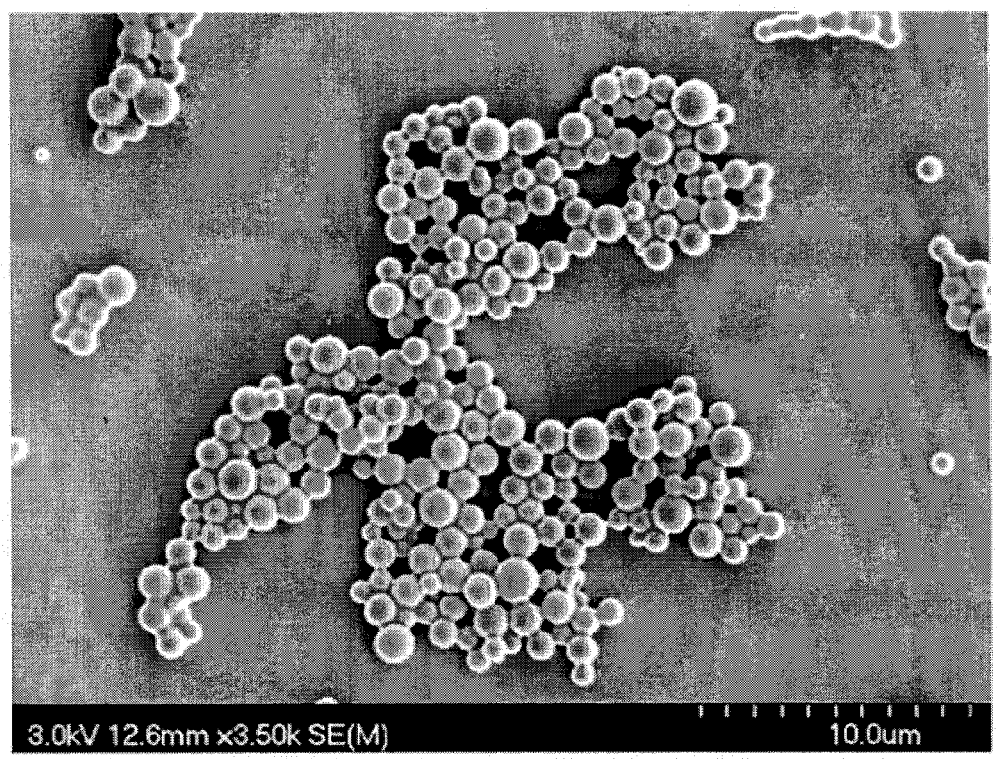
Figure 11:
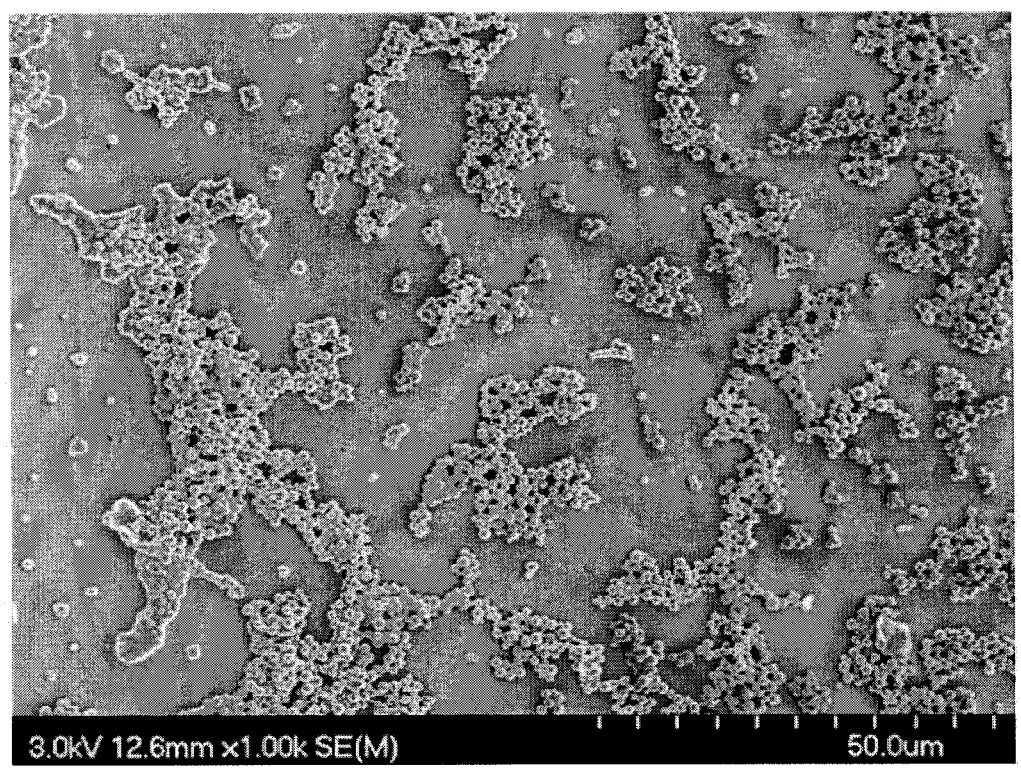

FIGS. 2 to 4 are SEM images of the bulky porous polyurea material, the particulate porous polyurea material and the film-like porous polyurea material prepared in Preparation Examples 1, 4 and 9, respectively.

Referring to FIGS. 2 to 4, it may be seen that the porous polyurea materials may be prepared in various forms by appropriately selecting the solution concentration, the reaction time and the preparation method thereof.

FIGS. 5 to 11 are SEM images of various kinds of porous particles prepared using different monomers for different reaction times in accordance with the method for preparing a particulate porous polyurea material.

Referring to FIGS. 5 to 11 and 3, it may be seen that porous particles having various sizes may be prepared by the method for preparing a particulate polyurea material according to the present invention.

Figure 12:
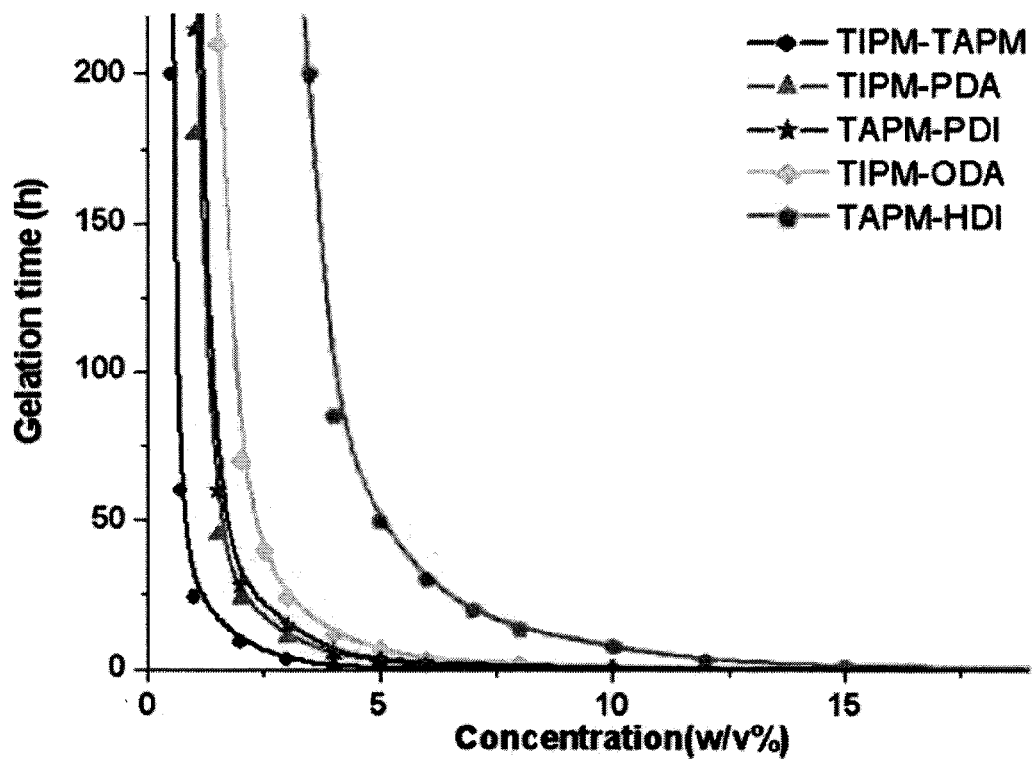
FIG. 12 is a graph showing changes in the gelation time of reaction solutions of monomer solutions with varying concentrations of the monomer solutions.

FIG. 12 is a graph showing changes in the gelation time of the reaction solutions with varying concentrations of the monomer solutions.

Referring to FIG. 12, the reaction solutions of the monomer solutions having a concentration of about 1-5% (wt/vol) are gelled in an appropriate time range despite differences in gelation time depending on the kind of the monomers. These results indicate that the use of solutions having concentrations within the range defined above enables the preparation of a bulky, particulate or film-like porous polyurea material.

(In FIG. 12, TIPM, TAPM, PDA, PDI, ODA and HDI are abbreviations for tetra(4-isocyanatophenyl)methane, tetra(4-aminophenyl)methane, 1,4-diaminobenzene(p-phenylenediamine), 1,4-diisocyanatobenzene(p-phenylenediisocyanate), 4,4'-oxydianiline and 1,6-diisocyanatohexane(hexylenediisocyanate). For example, TIPM-TAPM represents a mixed solution of tetra(4-isocyanatophenyl)methane and tetra(4-aminophenyl)methane monomers).

Figure 13:
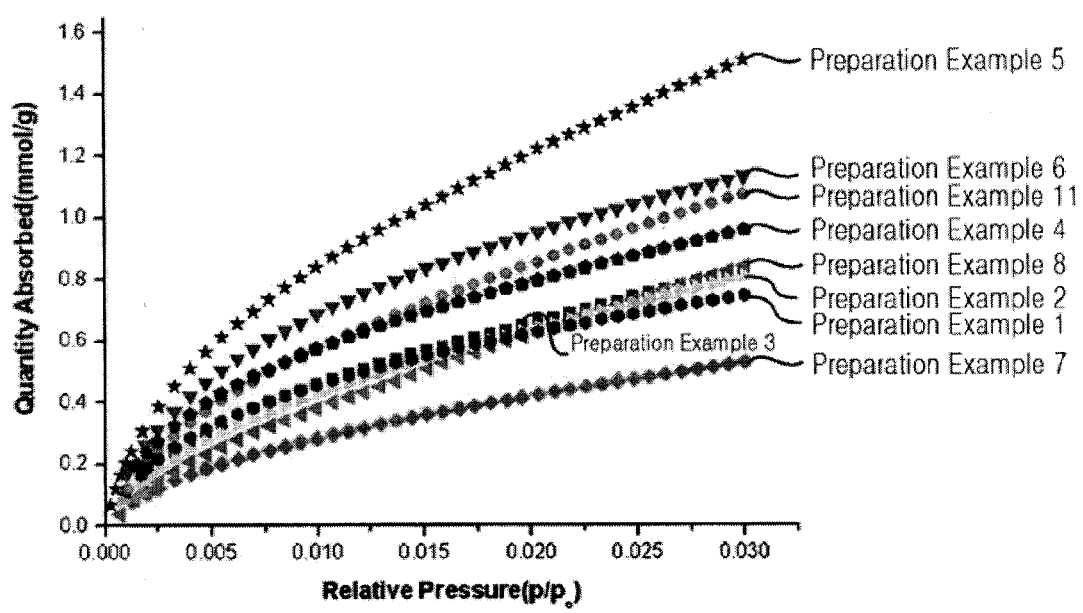
FIG. 13 is a graph showing changes in the quantity of carbon dioxide gas adsorbed to bulky porous polyurea materials, particulate porous polyurea materials and film-like porous polyurea materials prepared in Preparation Examples 1 to 8 and 11 in response to the partial pressure of the gas.

FIG. 13 is a graph showing quantities of carbon dioxide gas adsorbed to the bulky porous polyurea materials, the particulate porous polyurea materials and the film-like porous polyurea materials prepared in Preparation Examples 1 to 8 and 11.

Referring to FIG. 13, the porous materials prepared in Preparation Examples 1 to 8 and 11 were confirmed to adsorb the gas. A substantially larger amount of the carbon dioxide gas was adsorbed to the particulate porous polyurea materials. This appears to be because the gas was more easily diffused into the particulate porous polyurea materials through pores present between the particles of the particulate porous polyurea materials than into the bulky and film-like porous polyurea materials.

Figure 14:
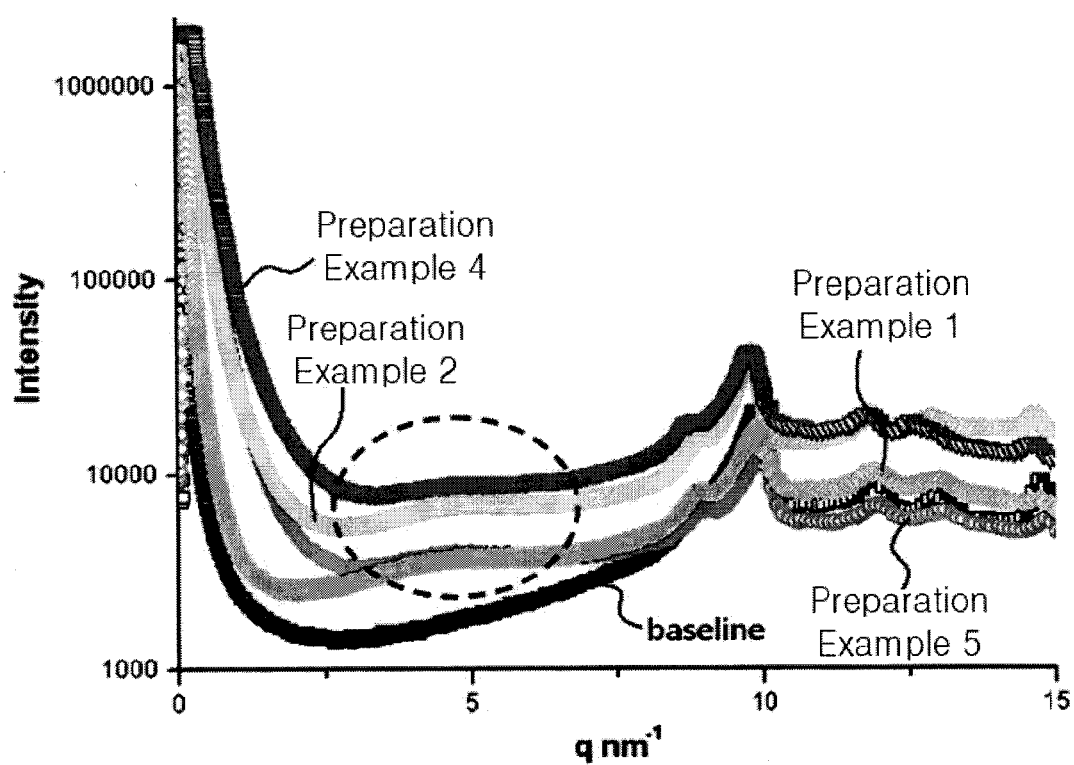
FIG. 14 shows small-angle X-ray scattering (SAXS) profiles of porous polyurea materials prepared in Preparation Examples 1, 2, 4 and 5.

FIG. 14 shows SAXS profiles of the porous polyurea materials prepared in Preparation Examples 1, 2, 4 and 5.

Referring to FIG. 14, the porous polyurea materials are amorphous in structure as a whole but show scattering in the small-angle regions, which demonstrates that the porous polyurea materials have fine pores whose diameter is in the nanometer range.

Carbon dioxide gas adsorption tests were conducted on the bulky, particulate and film-like porous polyurea materials prepared in Preparation Examples 1-8 and 11 to measure the surface areas, pore sizes and pore volumes of the porous polyurea materials. Results are summarized in Table 1.

TABLE 1

|  | Surface area ($m^2/g$) | Pore size (diameter) (nm) | Pore volume ($cm^3/g$) |
| --- | --- | --- | --- |
| Preparation Example 1 | 159 | 1.6 | 0.07 |
| Preparation Example 2 | 254 | 1.8 | 0.12 |
| Preparation Example 3 | 196 | 1.7 | 0.09 |

TABLE 1-continued

|  | Surface area ($m^2/g$) | Pore size (diameter) (nm) | Pore volume ($cm^3/g$) |
| --- | --- | --- | --- |
| Preparation Example 4 | 219 | 1.7 | 0.09 |
| Preparation Example 5 | 560 | 1.8 | 0.16 |
| Preparation Example 6 | 226 | 1.6 | 0.09 |
| Preparation Example 7 | 171 | 1.9 | 0.08 |
| Preparation Example 8 | 252 | 1.8 | 0.11 |
| Preparation Example 11 | 276 | 1.8 | 0.12 |

As may be seen from the results in Table 1, the porous materials having various surface areas and pore sizes may be prepared by appropriately selecting the preparation method thereof.

Although the present invention has been described herein with reference to its preferred embodiments, these embodiments do not serve to limit the scope of the invention and those skilled in the art will appreciate that various modifications and changes are possible without departing from the spirit and scope of the invention.

The invention claimed is:

1. A porous polyurea material obtained by polymerization and crosslinking of a monomer represented by Formula 1:

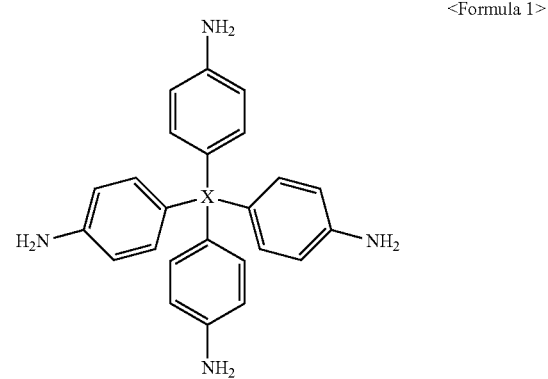

<Formula 1>

(wherein X is a carbon atom or a silicon atom) with a monomer having two to four isocyanate groups, or by polymerization and crosslinking of a monomer represented by Formula 2:

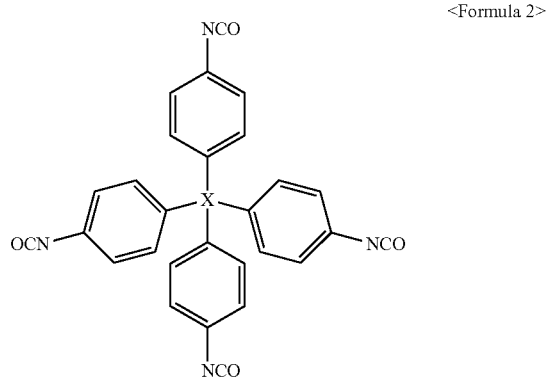

<Formula 2>

(wherein X is a carbon atom or a silicon atom) with a monomer having two to four amino groups.

2. The porous polyurea material of claim 1, wherein the monomer having two to four isocyanate groups is a $C_1$-$C_{20}$ aliphatic compound substituted with two to four isocyanate groups or a $C_6$-$C_{30}$ aromatic compound substituted with two to four isocyanate groups, and the monomer having two to four amino groups is a $C_1$-$C_{20}$ aliphatic compound substituted with two to four amino groups or a $C_6$-$C_{30}$ aromatic compound substituted with two to four amino groups.

3. The porous polyurea material of claim 2, wherein the $C_1$-$C_{20}$ aliphatic compound substituted with two isocyanate groups or the $C_1$-$C_{20}$ aliphatic compound substituted with two amino groups is a compound represented by Formula 3:

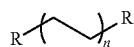

<Formula 3>

(wherein each R is an isocyanate group or an amino group, and n is an integer from 2 to 6), and the $C_6$-$C_{30}$ aromatic compound substituted with two to four isocyanate groups and/or the $C_6$-$C_{30}$ aromatic compound substituted with two to four amino groups is selected from the group consisting of compounds represented by Formulae 4 to 10:

<Formula 4>

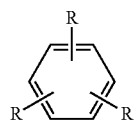

<Formula 5>

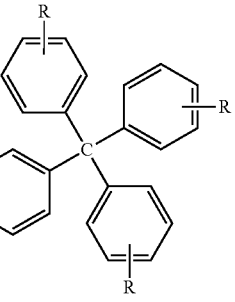

<Formula 6>

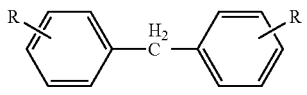

<Formula 7>

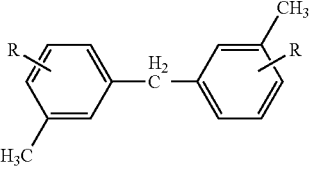

<Formula 8>

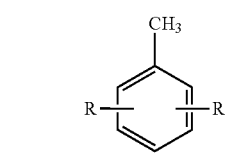

<Formula 9>

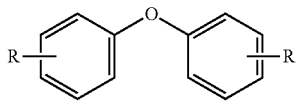

<Formula 10>

(wherein each R is an isocyanate group or an amino group).

4. The porous polyurea material of claim 1, wherein the porous material has a pore diameter of 0.5 mm to 3.0 mm and a specific surface area of 50 m²/g to 1,000 m²/g.

5. A method for preparing a porous polyurea material, comprising:
(a) mixing an organic solution of a monomer represented by Formula 1:

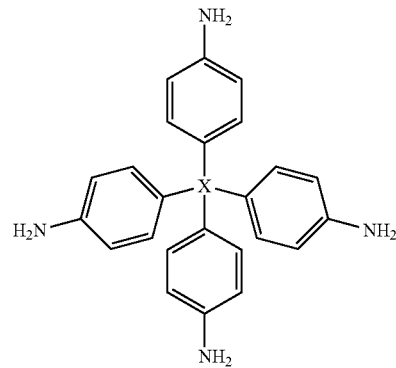

<Formula 1>

(wherein X is a carbon atom or a silicon atom) with an organic solution of a monomer having two to four isocyanate groups, or mixing an organic solution of a monomer represented by Formula 2:

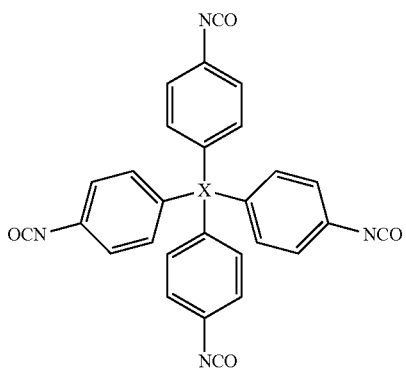

<Formula 2>

(wherein X is a carbon atom or a silicon atom) with an organic solution of a monomer having two to four amino groups;
(b) reacting the mixed solution under a nitrogen atmosphere; and
(c) drying a solid material formed by gelation of the reaction solution.

6. The method of claim 5, wherein the monomer having two to four isocyanate groups is a $C_1$-$C_{20}$ aliphatic compound substituted with two to four isocyanate groups or a $C_6$-$C_{30}$ aromatic compound substituted with two to four isocyanate groups, and the monomer having two to four amino groups is a $C_1$-$C_{20}$ aliphatic compound substituted with two to four amino groups or a $C_6$-$C_{30}$ aromatic compound substituted with two to four amino groups.

7. The method of claim 6, wherein the $C_1$-$C_{20}$ aliphatic compound substituted with two isocyanate groups or the $C_1$-$C_{20}$ aliphatic compound substituted with two amino groups is a compound represented by Formula 3:

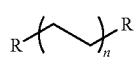

<Formula 3>

(wherein each R is an isocyanate group or an amino group, and n is an integer from 2 to 6), and the $C_6$-$C_{30}$ aromatic compound substituted with two to four isocyanate groups and/or the $C_6$-$C_{30}$ aromatic compound substituted with two to four amino groups is selected from the group consisting of compounds represented by Formulae 4 to 10:

<Formula 4>

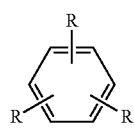

<Formula 5>

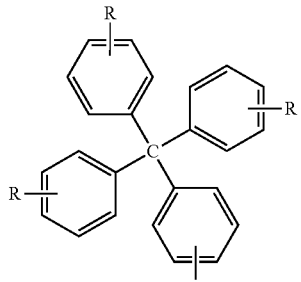

<Formula 6>

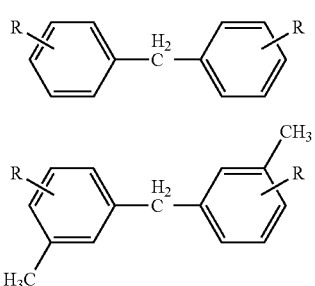

<Formula 7>

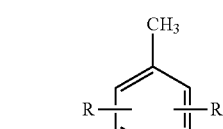

<Formula 8>

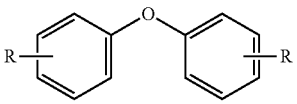

<Formula 9>

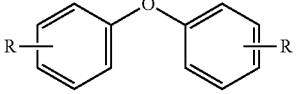

<Formula 10>

(wherein each R is an isocyanate group or an amino group).

8. The method of claim 5, wherein each of the organic solutions in step (a) has a concentration of 1 to 5% (wt/vol).

9. A method for preparing a particulate porous polyurea material, comprising:
   (a) mixing an organic solution of a monomer represented by Formula 1:

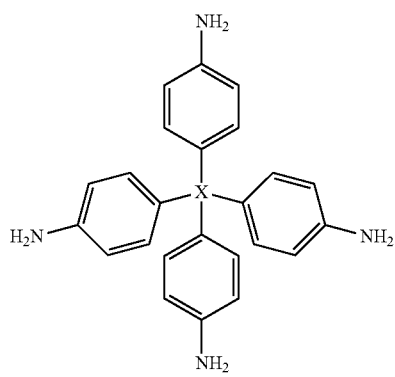

<Formula 1>

(wherein X is a carbon atom or a silicon atom) with an organic solution of a monomer having two to four isocyanate groups, or mixing an organic solution of a monomer represented by Formula 2:

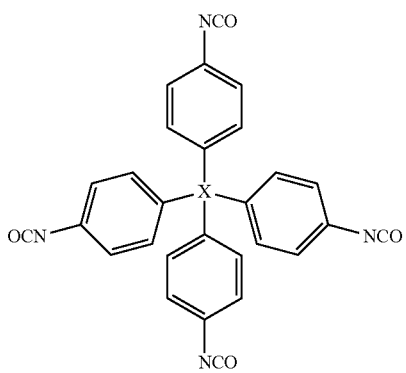

<Formula 2>

(wherein X is a carbon atom or a silicon atom) with an organic solution of a monomer having two to four amino groups;
   (b) reacting the mixed solution under a nitrogen atmosphere; and
   (c) adding the reaction solution to a non-solvent before gelation of the reaction solution to form a precipitate, followed by drying.

10. The method of claim 9, wherein the porous material has a particle diameter of 20 nm to 1,000 nm.

11. The method of claim 9, wherein the monomer having two to four isocyanate groups is a $C_1$-$C_{20}$ aliphatic compound substituted with two to four isocyanate groups or a $C_6$-$C_{30}$ aromatic compound substituted with two to four isocyanate groups, and the monomer having two to four amino groups is a $C_1$-$C_{20}$ aliphatic compound substituted with two to four amino groups or a $C_6$-$C_{30}$ aromatic compound substituted with two to four amino groups.

12. The method of claim 11, wherein the $C_1$-$C_{20}$ aliphatic compound substituted with two isocyanate groups or the $C_1$-$C_{20}$ aliphatic compound substituted with two amino groups is a compound represented by Formula 3:

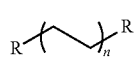
<Formula 3>

(wherein each R is an isocyanate group or an amino group, and n is an integer from 2 to 6), and the $C_6$-$C_{30}$ aromatic compound substituted with two to four isocyanate groups and/or the $C_6$-$C_{30}$ aromatic compound substituted with two to four amino groups is selected from the group consisting of compounds represented by Formulae 4 to 10:

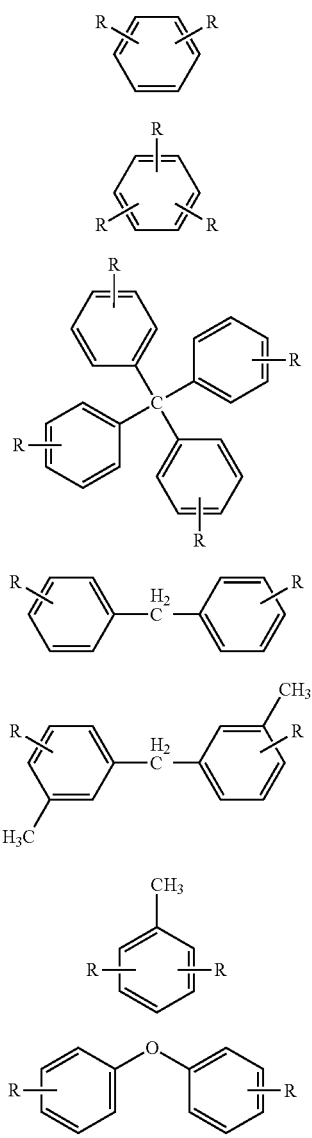

<Formula 4>

<Formula 5>

<Formula 6>

<Formula 7>

<Formula 8>

<Formula 9>

<Formula 10>

(wherein each R is an isocyanate group or an amino group).

13. The method of claim 9, wherein each of the organic solutions in step (a) has a concentration of 1 to 5% (wt/vol).

14. A method for preparing film porous polyurea material, comprising:

(a) mixing an organic solution of a monomer represented by Formula 1:

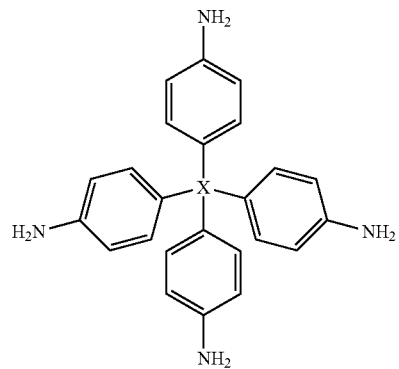
<Formula 1>

(wherein X is a carbon atom or a silicon atom) with an organic solution of a monomer having two to four isocyanate groups, or mixing an organic solution of a monomer represented by Formula 2:

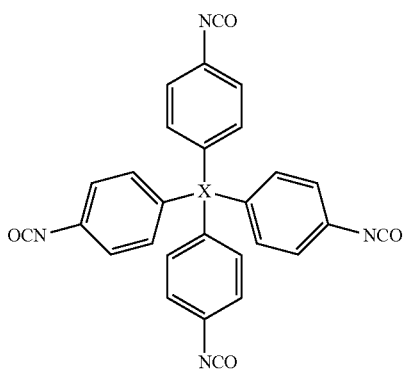
<Formula 2>

(wherein X is a carbon atom or a silicon atom) with an organic solution of a monomer having two to four amino groups;

(b) reacting the mixed solution under a nitrogen atmosphere; and (c) applying the reaction solution to a substrate before gelation of the reaction solution, followed by drying.

15. The method of claim 14, wherein the monomer having two to four isocyanate groups is a $C_1$-$C_{20}$ aliphatic compound substituted with two to four isocyanate groups or a $C_6$-$C_{30}$ aromatic compound substituted with two to four isocyanate groups, and the monomer having two to four amino groups is a $C_1$-$C_{20}$ aliphatic compound substituted with two to four amino groups or a $C_6$-$C_{30}$ aromatic compound substituted with two to four amino groups.

16. The method of claim 15, wherein the $C_1$-$C_{20}$ aliphatic compound substituted with two isocyanate groups or the $C_1$-$C_{20}$ aliphatic compound substituted with two amino groups is a compound represented by Formula 3:

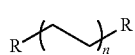
<Formula 3>

(wherein each R is an isocyanate group or an amino group, and n is an integer from 2 to 6), and the $C_6$-$C_{30}$ aromatic compound substituted with two to four isocyanate groups and/or the $C_6$-$C_{30}$ aromatic compound substituted with two to four amino groups is selected from the group consisting of compounds represented by Formulae 4 to 10:

<Formula 4>

<Formula 5>

<Formula 6>

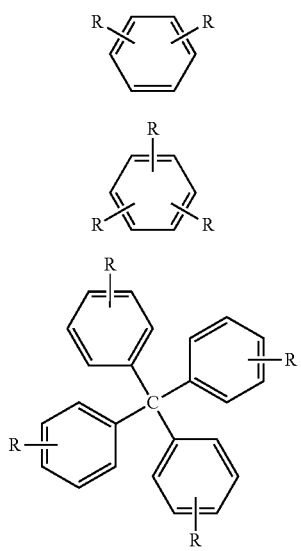

<Formula 7>

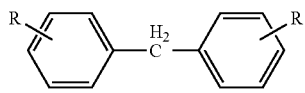

<Formula 8>

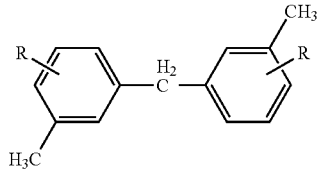

<Formula 9>

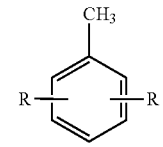

<Formula 10>

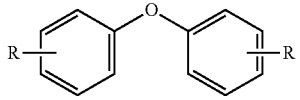

(wherein each R is an isocyanate group or an amino group).

17. The method of claim 14, wherein each of the organic solutions in step (a) has a concentration of 1 to 5% (wt/vol).

* * * * *